UNITED STATES PATENT OFFICE 2,557,730

MANUFACTURE OF MIXED PHOSPHATIC FERTILIZERS

Viktor Ettel, Prague, Czechoslovakia, assignor to Spolek pro chemickou a hutni vyrobu, narodní podnik-United Chemical and Metallurgical Works, National Corporation, Prague, Czechoslovakia No Drawing. Application July 29, 1948, Serial No. 41,398. In Czechoslovakia May 8, 1947

6 Claims. (Cl. 71—37)

The present invention relates to improvements in or relating to the manufacture of mixed phosphatic fertilizers.

Mixed nitrogenous and phosphatic fertilizers may be prepared inter alia by the decomposition of natural phosphate rock by nitrogenous substances of a character such as ammonium bisulphate, nitric acid or the like.

Apparently, the most suitable method would be the decomposition of phosphate rock by means of nitric acid following the equation $$Ca_3(PO_4)_2 + 4HNO_3 = Ca(H_2PO_4)_2 + 2Ca(NO_3)_2$$

or $$Ca_3(PO_4)_2 + 6HNO_3 = 2H_3PO_4 + 3Ca(NO_3)_2$$

The practical execution of such a reaction is, however, difficult as the reaction mixture is smeary or pasty, and there occur an overheating during the decomposition process and losses of nitric acid, furthermore, the drying operation is difficult and accompanied by further losses, the final product is hygroscopic, unstable and damages wrappings, while further losses occur during storage.

The above drawbacks are reduced by the admixture of ammonium sulphate or potassium sulphate. Calcium nitrate is transformed into calcium sulphate by the added ammonium sulphate according to the following equation:

$$Ca(H_2PO_4)_2 + 2Ca(NO_3)_2 + 2(NH_4)_2SO_4 = Ca(H_2PO_4)_2 + 2CaSO_4 + 4NH_4NO_3$$

or $$Ca(H_2PO_4)_2 + 2Ca(NO_3)_2 + 3(NH_4)_2SO_4 = 2NH_4H_2PO_4 + 3CaSO_4 + 4NH_4NO_3$$

The produced ammonium nitrate is, however, hygroscopic again. Its hygroscopic nature may be reduced to a certain extent if ammonium sulphate is used in excess, because then double salt $(NH_4)_2SO_4.2NH_4NO_3$, of a less hygroscopic nature is produced. An admixture of potassium sulphate has yielded better results as in the transforation of calcium nitrate into calcium sulphate, potassium nitrate or primary potassium phosphate are produced, said substances being not hygroscopic.

But even this process has its drawbacks. If in a single operational step a loose material has to be arrived at it is necessary to employ a relatively concentrated nitric acid, over 60%, and the reaction mixture is then consistent from the very beginning. The withdrawal of the reaction heat is therefore difficult, and an overheating and losses in nitric acid occur easily. The transformation into calcium sulphate in this medium is slow and incomplete, in consequence of which production apparatus of low efficiency, such as kneading machines, have to be employed.

The decomposition of phosphates and transformation of products takes place far easier when diluated nitric acid is used. In such a case a solution of calcium nitrate is obtained, comprising according to the condition of the reaction primary monocalcium phosphate or phosphoric acid. This solution may be purified by filtration and the transformation caused by the addition of alkali sulphates is far quicker and more complete. A portion of the sulphate is, however, entrained into the precipitate in the form of double sulphates, such as syngenit $$CaSO_4.K_2SO_4.H_2O$$

and potassium pentacalcium sulphate $$K_2SO_4.5CaSO_4.H_2O$$

or similar ammonium compounds.

The present invention relates primarily to a method of production of mixed nitrogenous and phosphatic fertilizers by decomposition of natural phosphates by means of technical ammonium imidosulphonate, accompanied, as usual by ammonium nitrilosulphonate and ammonium amidosulphonate and in the second instance to a method of production of rational full value fertilizers containing all three principal ingredients nitrogen, phosphorus and potassium, by means of a similar decomposition of phosphates under coaction of potassium salts.

In order to clarify the nature of the reaction it is first of all necessary to consider certain properties of ammonium imidosulphonate and ammonium nitrilosulphonate. Ammonium nitrilosulphonate is stable in basic solutions only, and its aqueous solutions have an acid reaction, because nitrilosulphonate in a solution is decomposed already in cool state according to the equation $$N(SO_3NH_4)_3 + H_2O = NH(SO_3NH_4)_2 + NH_4HSO_4$$

into ammonium imidosulphonate and ammonium bisulphate.

Ammonium imidosulphonate, on the other hand, is stable in cool condition even in neutral solution, when heated is hydrolysed into amidosulphonate and ammonium bisulphate or free amidosulphonic acid and ammonium sulphate according to the equation $$NH(SO_3NH_4)_2 + H_2O = NH_2SO_3NH_4 + NH_4HSO_4$$

or $$= NH_2SO_3H + (NH_4)_2SO_4$$

The speed of the hydrolysis is dependent on the hydrogen-ion concentration or pH value. By the increase of pH value i. e. in acidifying the solution the hydrolysis is substantially accelerated. The amidosulphonic acid produced in the hydrolysis is relatively stable and only after a longer heating with water is transformed into ammonium bisulphate according to the equation $$NH_2SO_3H + H_2O = NH_4HSO_4$$

The decomposition of a tricalcium orthophosphate by means of ammonium nitrilosulphonate takes place gradually according to the following equations:

(a) $Ca_3(PO_4)_2 + 2N(SO_3NH_4)_3 + 2H_2O =$
    $2CaHPO_4 + 2NH(SO_3NH_4)_2 + CaSO_4 + (NH_4)_2SO_4$ (b) $Ca_3(PO_4)_2 + 4N(SO_3NH_4)_3 + 4H_2O =$
    $Ca(H_2PO_4)_2 + 4NH(SO_3NH_4)_2 + 2CaSO_4 + 2(NH_4)_2SO_4$ (c) $Ca_3(PO_4)_2 + 6N(SO_3NH_4)_3 + 6H_2O =$
    $2H_3PO_4 + 6NH(SO_3NH_4)_2 + 3CaSO_4 + 3(NH_4)_2SO_4$

The mixture is, however, overheated by the reaction heat and hydrolysis of the ammonium imidosulphonate then takes place with simultaneous generation of bisulphate and ammonium amidosulphonate, so that a further decomposition of the calcium orthophosphate according to the following equations takes place:

(d) $Ca_3(PO_4)_2 + 2NH(SO_3NH_4)_2 + 2H_2O =$
    $2CaHPO_4 + NH_2SO_3NH_4 + CaSO_4 + (NH_4)_2SO_4$ (e) $Ca_3(PO_4)_2 + 4NH(SO_3NH_4)_2 + 4H_2O =$
    $Ca(H_2PO_4)_2 + 4NH_2SO_3NH_4 + 2CaSO_4 + 2(NH_4)_2SO_4$ (f) $Ca_3(PO_4)_2 + 6NH(SO_3NH_4)_2 + 6H_2O =$
    $2H_3PO_4 + 6NH_2SO_3NH_4 + 3CaSO_4 + 3(NH_4)_2SO_4$

A secondary and primary phosphate in addition to free phosphoric acid is thus produced successively from the tertiary calcium orthophosphate. According to the working conditions the final product contains a larger or smaller quantity of phosphoric acid, soluble in ammonium citrate.

Actually the reaction conditions are far more complex. Technical imidosulphonate is a mixture of amidosulphonate, imidosulphonate and nitrilosulphonate or even of an ammonium bisulphate so that practically all these reactions run concurrently. In addition, further reactions take place, such as the above mentioned hydrolysis of the aminosulphonic acid into ammonium bisulphate, further a hydration of calcium sulphate accompanied by simultaneous production of ammonium syngenite and the like.

The new process is substantially different in this respect from the normal decomposition of phosphate by sulphuric acid, wherein with regard to the high concentration of the sulphuric acid employed anhydric calcium sulphate or anhydrite is preponderantly formed. In the present case diluted acids are used and dihydrate $CaSO_4.2H_2O$ is therefore obtained.

The consumption of water in connection with the above reaction is actually higher e. g. the equation of the reaction (e) is modified as follows:

(e) $Ca_3(PO_4)_2 + 4NH(SO_3NH_4)_2 + 9H_2O =$
    $Ca(H_2PO_4)_2.H_2O + NH_2SO_3NH_4 + 2CaSO_4.2H_2O + 2(NH_4)_2SO_4$

The main advantages of the new process are apparent already from the above partial reaction, i. e. the possibility to work with relatively diluted solutions wherein water is bound on the one hand by hydrolysis and on the other hand by hydration, leading to a favourable quick solidification of the reaction mixture.

In practically executing this reaction on a larger scale an excess of imidosulphonate has to be used, because if a stoichiometric quantity is used, the decomposition is slow and incomplete. The cause has to be sought on the one hand in the small reactivity, on the other hand in the pasty consistency of the reaction mixture which interferes with the smooth progress of the reaction. It is only the employment of a substantial excess of imidosulphonate which leads to a satisfactory decomposition.

In thoroughly studying the reaction it has been found that the chief cause of the slow progress of the reaction is small acidity. The ammonium bisulphate produced by the hydrolysis of the nitrilosulphonate is instantaneously neutralised by the calcium phosphate present and the remaining imidosulphonate cannot be hydrolysed on a larger scale even at an increased temperature, because the calcium phopshate neutralizes instantaneously the acid reaction, stabilizing thus the imidosulphonate. In order to make the reaction proceed with sufficient speed it is necessary to add such an amount of mineral acid as will ensure a permanent acid reaction of the mixture. The secondary calcium orthophosphate $CaHPO_4$ having a practically neutral reaction, this means that there must be added to the reaction mixture at least one equivalent of a mineral acid to one mol of $Ca_3(PO_4)_2$.

This process has considerable advantages; the reaction is far quicker and more complete while diluted acids may also be used. Imidosulphonate requiring for its hydrolysis one to two mols $H_2O$, nitrilosulphonate 1 to 3 mols $H_2O$, a thick mixture is automatically formed without the employment of heat. Moreover the hydration of the generated calcium sulphate into gypsum or into ammonium syngenit with a further consumption of water takes place.

In order to acidify the reaction mixture it is possible to use not only sulphuric acid but also nitric acid or hydrochloric acid. When employing two equivalents of the said acids, the decomposition of the phosphate takes place according to the following equations (a) $Ca_3(PO_4)_2 + H_2SO_4 + 2NH(SO_3NH_4)_2 + 2H_2O =$
    $Ca(H_2PO_4)_2 + 2NH_2SO_3NH_4 + 2CaSO_4 + (NH_4)_2SO_4$ (b) $Ca_3(PO_4)_2 + 2HNO_3 + 2NH(SO_3NH_4)_2 + 2H_2O =$
    $Ca(H_2PO_4)_2 + 2NH_2SO_3NH_4 + 2CaSO_4 + 2NH_4NO_3$ (c) $Ca_3(PO_4)_2 + 2HCl + 2NH(SO_3NH_4)_2 + 2H_2O =$
    $Ca(H_2PO_4)_2 + 2NH_2SO_3NH_4 + 2CaSO_4 + 2NH_4Cl$ The decomposition of the phosphate, and in connection with the employment of nitric or hydrochloric acid, the transformation of the primarily formed calcium nitrate or calcium chloride into calcium sulphate and the respective ammonium salt take place. The result of the reaction is a loose non-hygroscopic product.

In a similar way as in connection with the decomposition of phosphates by nitric acid alone, it is possible in this case to accelerate the solidification of the mixture by an addition of potassium salts, in particular potassium sulphate or if required, kainite. In this way rational full value of fertilizers are obtained, containing in addition to free and in water soluble phosphoric acid $P_2O_5$ a form soluble in ammonium citrate, further nitrogen in three forms i. e. ammonia nitrogen, salpetre nitrogen and sulphamid nitrogen and finally potash $K_2O$ partially in soluble form and partially loosely bound in the form of syngenite.

The composition of all these fertilizers may be altered within wide ranges and thus adapted to varying requirements. In a similar way as with superphosphate it is possible to obtain in one operational step a product, which after a short period of maturing may be delivered to the consumer. The degree of decomposition amounts in this instance to as much as 95%; the produced fertilizers are stable, do not absorb water nor do they damage bags.

By the process according to the invention it is possible to treat even less valuable phosphate rock which are difficult to decompose or are of a low percentage such as apatite "Kola," phosphate chalk or rock phosphates with a high contents of $Fe_2O_3$ and $Al_2O_3$ which, as it is known cannot be treated in the usual way. The manufacturing process itself is very simple. Finely ground phosphate rock is mixed with ground potassium salt and ammonium imidosulphonate which is delivered in the form of a very loose powder, the necessary amount of diluted acid is added and the mixture thoroughly mixed e. g. in a kneading machine. The reaction mass is at first liquified and then gradually thickened until finally it completely solidifies. The period required for solidification varies and depends from the composition. Mixtures containing potassium sulphate are quickest in solidifying the latter taking about 30 minutes. In semi-solid condition the mixture may easily be granulated, if required.

*Example 1*

Decomposition without addition of acid.
The following substances are thoroughly mixed:

42 kg. of ground phosphate "Morocco"
200 kg. technical ammonium imidosulphonate (an excess of about 100%)
24 litres of water.

After kneading the mixture is left at rest until complete solidification has taken place. When the decomposition is finished a fertilizer is obtained containing 7.02% of the total $P_2O_5$ out of which 4.8% are soluble in water and 1.4% soluble in ammonium citrate. The total nitrogen content amounts to 17.57% of which 11.01% are ammonia nitrogen and the remainder 6.56% sulphamid nitrogen. The total degree of decomposition amounts to 88.5%.

The results are however not entirely satisfactory as the reaction is too slow, decomposition incomplete, solidification takes too long, but may be accelerated by an addition of potassium salts preferably potassium sulphate.

*Example 2*

Decomposition with an addition of nitric acid:

20 kg. phosphate "Morocco"
15 kg. technical ammonium imidosulphonate
18 kg. potassium sulphate and
13 litres of 53% nitric acid are mixed, kneaded and allowed to solidify. The fertilizer obtained contains 9.53% of the total $P_2O_5$ out of which 7.93% is soluble in water and 1.34% soluble in ammonium citrate; further 2.97% of ammonia nitrogen and 3.57% saltpetre nitrogen.

*Example 3*

Decomposition with an addition of hydrochloric acid.

20 kg. phosphate "Morocco"
20 kg. technical ammonium imidosulphonate
20 litres of concentrated hydrochloric acid are mixed, kneaded and allowed to solidify. The produced fertilizer contains 14.9% of the total $P_2O_5$ out of which there is 12.25% soluble in water and 0.67% soluble in ammonium citrate, further 5.58% of total nitrogen out of which there is 4.17% ammonia nitrogen and the remainder sulphamid nitrogen.

*Example 4*

Decomposition with an addition of sulphuric acid.

31 kg. phosphate "Morocco"
20 kg. technical ammonium imidosulphonate
20 kg. potassium sulphate and
35 kg. 30% sulphuric acid are mixed, kneaded and allowed to solidify. The final product has 11.8% of the total $P_2O_5$ out of which there is 6.28% soluble in water and 3.08% in ammonium citrate, further 7.57% of total nitrogen, of which there is 4.55% ammonia nitrogen and the remainder sulphamid nitrogen.

*Example 5*

Decomposition with admixture of hydrochloric acid.

31.5 kg. "Agrofose" containing 26.3% $P_2O_5$
30 kg. technical ammonium imidosulphonate
15 kg. potassium sulphate and
18 litres technical hydrochloric acid of 30% are thoroughly mixed and allowed to solidify. The produced fertilizer contains 11.3% of the total $P_2O_2$ out of which there are 8.0% soluble in water and 2.0% in ammonium citrate, the degree of decomposition amounting to 90%. The fertilizer contains further 6.99% of the total nitrogen out of which there are 4.82% ammonia nitrogen and 2.17% sulphamid nitrogen and finally 8.40% potash $K_2O$.

While I have disclosed the principles of my invention in connection with several embodiments it will be understood that these embodiments are given by way of example only and not so as limiting the scope of the invention as set forth in the appended claims.

I claim:
1. A process of producing phosphatic fertilizers from natural phosphatic minerals, which includes the steps of reacting the comminuted phosphatic minerals in the presence of water with technical ammonium imidosulphonate contaminated with ammonium amidosulphonate and ammonium nitrilosulphonate under mechanical agitation, kneading the mixture, permitting the mixture to congeal, and breaking up the congealed mass into proper condition for use.

2. A process of producing phosphatic fertilizers from natural phosphatic minerals, which includes the steps of reacting the comminuted phosphatic minerals in the presence of water with technical ammonium imidosulphonate contaminated with ammonium amidosulphonate and ammonium nitrilosulphonate in the proportion of at least 1 mol of phosphate to 4 mols of ammonium imidosulphonate and to 4 mols of water under mechanical agitation, kneading the mixture, permitting the mixture to congeal, and breaking up the congealed mass into proper condition for use.

3. A process of producing phosphatic fertilizers from natural phosphatic minerals which includes the steps of reacting the comminuted phosphatic minerals in the presence of water and a strong inorganic acid of the group consisting of sulphuric acid, hydrochloric acid and nitric acid with technical ammonium imidosulphonate contaminated with ammonium amidosulphonate and ammonium nitrilosulphonate under mechanical agitation, kneading the mixture, permitting the mixture to congeal and breaking up the congealed mass into proper condition for use.

4. A process of producing phosphatic fertilizers from natural phosphatic minerals, which includes the steps of reacting the comminuted phosphatic minerals in the presence of water and strong inorganic acid of the group consisting of sulphuric acid, hydrochloric acid and nitric acid with technical ammonium imidosulphonate contaminated with amidosulphonate and ammonium nitrilosulphonate, wherein the inorganic acid is added to the mixture in the proportion at least of 1 equivalent of acid to 1 mol of phosphate $Ca_3(PO_4)_2$ under mechanical agitation, kneading of the mixture, permitting the mixture to congeal and breaking up the congealed mass into proper condition for use.

5. A process of producing phosphatic fertilizers from natural phosphatic minerals, which includes the steps of reacting the comminuted phosphatic minerals in the presence of water and finely ground potassium salt which technical ammonium imidosulphonate contaminated with ammonium amidosulphonate and ammonium nitrilosulphonate under mechanical agitation, kneading the mixture, permitting the mixture to congeal and breaking up the congealed mass into proper condition for use.

6. A process of producing phosphatic fertilizers from natural phosphatic minerals, which includes the steps of reacting the comminuted phosphatic minerals in the presence of water, finely ground potassium salt and a strong inorganic acid of the group consisting of sulphuric acid, hydrochloric acid and nitric acid, with technical ammonium imidosulphonate contaminated with ammonium amidosulphonate and ammonium nitrilosulphonate, under mechanical agitation, kneading the mixture to congeal and breaking up the congealed mass into proper condition for use.

VIKTOR ETTEL.

REFERENCES CITED

The following references are of record in the file of this patent:

UNITED STATES PATENTS

| Number | Name | Date |
|---|---|---|
| 1,710,272 | Richter | Apr. 23, 1929 |
| 1,837,328 | Ober et al. | Dec. 22, 1931 |
| 2,036,494 | Plummer | Apr. 7, 1936 |
| 2,237,826 | Woodhouse | Apr. 8, 1941 |